United States Patent Office 3,020,230
Patented Feb. 6, 1962

3,020,230
COAGULATION OF DISPERSED SOLIDS
Keith L. Smith, Charleston, W. Va., assignor to Union
Carbide Corporation, a corporation of New York
No Drawing. Filed Oct. 28, 1957, Ser. No. 692,523
6 Claims. (Cl. 210—54)

This invention relates to the coagulation of a liquid suspension comprising silica.

Suspensions of silica often occur naturally in surface water giving a turbid appearance to these waters. Various industries employing enormous quantities of water daily for such purposes as steam generation, cooling large reactors, etc., have a need for relatively pure water, that is, water substantially free of solids dispersed therein. The disadvantages of employing water containing appreciable quantities of dispersed silica are apparent, namely: (1) silica has an abrasive and corrosive effect on the plant equipment, such as the cooling coils, conduits, etc.; (2) silica tends to foul and plug the check valves, pumps, and the like; and (3) economic disadvantage resulting from lower efficiency of the system, periodical shutdowns, and other factors. Consequently, it behooves such industries which utilize tremendous quantities of water to employ a source of water which is relatively free of silica suspensions. In passing, it should also be mentioned that in certain sectors of the United States water is oftentimes a scarce commodity, and an efficient method for removing silica suspensions in the available water can aid in preserving the existing water table.

In the plate glass industry, aqueous slurries of silica are formed in the grinding and polishing operations in which sand is used as the abrasive. The use of coarse and relatively finer sand particles in the grinding and polishing of glass produces slurries of increasing fineness as the sand particles are reduced in size during these operations. It is desirable to facilitate the settling of the finely divided suspended sand particles for reuse in the above-mentioned operations, or for use in other fields such as in the production of silica gels. It, also, may be desirable to recover the water medium for reuse or for other uses.

The present invention contemplates the coagulation of a liquid suspension comprising silica by incorporating therein a coagulating amount of poly(ethylene oxide) which has a reduced viscosity in acetonitrile of at least 1.0 and upwards to 75, and higher, and preferably from about 20 to about 75. The poly(ethylene oxides) employed are solid, colorless, water-soluble compounds. They appear to form homogeneous systems in water in all proportions, although the relatively higher molecular weight ethylene oxide polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. The ethylene oxide polymers employed in this invention show little change in melting point with increased reduced viscosity (an indication of increased molecular weight) and the melting point, as measured by change in stiffness with temperature, was found to be about 65°±2° C. throughout the range of reduced viscosities of from about 1.0 to about 10, and greater. These polymers, upon X-ray examination, show the sort of crystallinity exhibited by polyethylene. The crystallization temperature, as determined from measuring the break in the cooling curve, is about 55° C. The polymers of ethylene oxide possessing a reduced viscosity of at least 1.0 are hard, tough, horny, water-soluble materials.

As will be shown hereinafter the liquid suspension, dispersion, or slurry can also contain appreciable quantities of impurities or by-products such as, for example, calcium carbonate, aluminum sulfate, magnesium carbonate, pulverized shale, dust, plate glass grinding by-products, potassium carbonate, iron sulfate, etc., therein. It also has been observed that the coagulating action of the poly(ethylene oxide) is effective in liquid suspension systems wherein the pH of said systems can vary from acidic to basic.

Accordingly, one or more of the following objects will be achieved by the practice of this invention.

It is an object of this invention to provide a novel process for coagulating a liquid suspension or dispersion comprising silica by the addition thereto of a coagulating amount of poly(ethylene oxide). It is another object of this invention to provide a novel process for clarifying water containing silica dispersed therein which will be suitable for use in industrial plants such as for a recycle medium, coolant for reactors, for the generation of steam, and the like. A further object of this invention is to provide a novel and efficient coagulation process which results in the recovery of silica useful for industrial applications. These and other objects will become apparent to those skilled in the art from a consideration of the instant specification.

The understanding and practice of the instant invention will be greatly facilitated by defining various terms which will be referred to hereinafter.

By the term "reduced viscosity," as used herein, is meant a value obtained by dividing the specific viscosity by the concentration of the ethylene oxide polymer in the solution, the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C.

The term "aqueous bulk viscosity," as used herein, refers to the viscosity of the stated concentration of polymer in water, as measured at two revolutions per minute on a Model RVF Brookfield viscometer at ambient room temperature, i.e., about 24° C. to about 27° C. As the reduced viscosity increases over a range of from above about 1.0 upwards to 60, and higher, the aqueous bulk viscosity, on the average, will increase. The term is an indication of the molecular weight.

The term "bulk polymerization process" refers to polymerization in the absence of an organic medium or diluent. The term "solution polymerization" refers to polymerization in the presence of an organic medium or diluent in which both the monomer employed and the polymer produced are soluble. The term "suspension polymerization process" refers to polymerization in the presence of an organic medium in which the monomer employed is soluble and the polymer produced is insoluble.

By the term "coagulating amount," as used herein, is meant that quantity of poly(ethylene oxide) which when added to a system comprising a liquid dispersion, suspension, or slurry containing silica therein is sufficient to coagulate said silica. The amount of poly(ethylene oxide) necessary to coagulate the slurry is governed, to an extent, on the reduced viscosity of the poly(ethylene oxide) and other considerations. The higher the reduced viscosity value of the poly(ethylene oxide), the lower, in general, the amount of poly(ethylene oxide) necessary to effect coagulation. The art is well apprised of the technique of coagulating, precipitating or flocculating the solids content from liquids containing these solids in dispersed or suspended form, and the over-all amount of poly(ethylene oxide) employed will be determined by the optimum conditions desired, the economics of the process, and the impurities present in the system.

It is pointed out that wherever the term "poly(ethylene oxide)" appears throughout the instant specification that said poly(ethylene oxide) has a reduced viscosity of at least 1.0, or an apparent viscosity, aqueous bulk viscosity, or intrinsic viscosity which, if converted, would be equivalent to a reduced viscosity of at least 1.0. The poly(ethylene oxide) employed in the present invention can be more aptly defined by the several physical characteristics or properties enumerated previously.

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, filed May 29, 1956, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide), e.g.; poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely divided solid particle form resembling in particle size finely divided sand. For further information regarding the production of granular poly(ethylene oxide) reference is hereby made to the disclosure of application Serial No. 587,955.

Lower olefin oxides such as ethylene oxide, propylene oxide, butylene oxide, and the like, can also be polymerized, in the presence of certain divalent metal amide-alcoholate catalysts, to solid polymers having a reduced viscosity of at least 1.0. This polymerization process is subject matter of application Serial No. 674,308, entitled "Epoxide Polymerization and Compounds Therefor," by F. N. Hill, J. T. Fitzpatrick, and F. E. Bailey, Jr., filed July 26, 1957, and assigned to the same assignee as the instant application. The particular class of catalysts employed in the polymerization process of the above-said application is the metal amide-alcoholates wherein the metal radical is a divalent metal with an atomic number greater than 4 and less than 57 from group II of the periodic table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as −30° C. and as high as +150° C. In a preferred embodiment ethylene oxide can be polymerized in the presence of an inert liquid organic medium in which the monomer is soluble and the resulting polymer is insoluble. Agitation of the reaction mixture and controlling the temperature between about −30° C. to about +70° C. results in the production of poly(ethylene oxide) in granular form. For further information regarding this polymerization route reference is hereby made to the disclosure of the above-identified application Serial No. 674,308.

In addition, ethylene oxide polymers which have been molecularly degraded to a reduced viscosity above about 1.0 by the reaction with a halogenating agent such as an alkali metal hypochlorite or alkaline earth metal hypochlorite can be employed in the instant invention with suitable results. The molecular degradation of poly(ethylene oxide) via treatment with a halogen or halogen-liberating compound is the subject matter of application Serial No. 668,306 entitled "Halogen Modified Poly(Alkylene Oxide) Resins," by K. L. Smith et al., filed June 27, 1957, and assigned to the same assignee as the instant application. Ethylene oxide polymers having a reduced viscosity above about 1.0 which have been subjected to reduced viscosity loss, i.e., decrease in molecular weight, via treatment with a peroxide compound, notably peracetic acid, are likewise suitable and conveniently employed in the instant invention. The peroxide compound degradation treatment is the subject matter of application Serial No. 668,547 entitled "Alkylene Oxide Polymers," by K. L. Smith and E. C. Seltzer, filed June 27, 1957, and assigned to the same assignee as the instant application.

As stated previously the instant invention contemplates the coagulation of a liquid suspension, dispersion or slurry comprising silica by adding thereto a coagulating amount of poly(ethylene oxide). In general, a poly(ethylene oxide) concentration in the range of from about 0.0001 weight percent (1.0 part per million) to about 0.05 weight percent (500 parts per million), and higher, based on the total weight of slurry or suspension, i.e., weight of solids plus liquid, is suitable. Based on the suspended solids in the slurry it has been observed that a poly(ethylene oxide) concentration in the range of from about 0.002 weight percent (20 parts per million) to about 5.0 weight percent, preferably from about 0.002 weight percent (20 parts per million) to about 2.0 weight percent, gives desirable results. By the practice of this invention it will be observed that the rate of flocculation and the rate of settling of the suspended solids, and/or the rate of filtration of flocculated material, are greatly enhanced.

It is feasible to add the poly(ethylene oxide) to the suspension or slurry as an aqueous solution. The preparation of an aqueous solution of poly(ethylene oxide) beforehand eliminates the necenessity of extensive stirring or agitation which can be occasioned by the addition of poly(ethylene oxide) in a solid form, and, moreover, the use of aqueous poly(ethylene oxide) solution lends itself as an attractive comercial expedient. If one desires poly(ethylene oxide) in a solid form can be added to the slurry or suspension in question, however, this method of addition is not preferred.

The instant invention also contemplates the use of poly(ethylene oxide) having an antioxidant incorporated therein such as those disclosed in application Serial No. 587,953, now Patent No. 2,897,178, entitled "Chemical Process and Product," by F. N. Hill, filed May 29, 1956, and assigned to the same assignee as the instant application. Among the antioxidants disclosed in the above-mentioned application include the use of diamine derivatives such as N,N-di(2-hydroxypropyl)-di-(2-hydroxyethyl)ethylenediamine, N,N,N'-tri(2-hydroxypropyl)-N'-(2-hydroxyethyl)ethylenediamine, N,N,N',N'-tetrakis(2-hydroxypropyl)ethylenediamine, and others. The antioxidants can be employed at a concentration in the range from about 0.5 to 5.0 weight percent, and higher, based on the polymer weight.

The following examples are illustrative.

EXAMPLE 1

Very finely-divided silica powder [1] was admixed with distilled water, under agitation, to give a suspension containing 5.0 weight percent silica, based on the total weight of solids plus liquid. The resulting suspension or slurry was stable for an indefinite period, and this slurry had a pH of 5.5. This slurry was divided into five portions, and to four of these portions poly(ethylene oxide) as a 0.1 weight percent aqueous solution was added in varying amounts as shown in Table I below. The fifth portion, i.e., no addition of poly(ethylene oxide), was used as the control. The poly(ethylene oxide) employed in these runs was prepared by polymerizing ethylene oxide in the presence of calcium amide catalyst and had a reduced viscosity of 31.3. A 1.05 weight percent aqueous bulk viscosity as measured on the Brookfield viscometer at 6 r.p.m. was 1,440 centipoises. This aqueous solution was diluted to 0.1 weight percent poly(ethylene oxide), and the resulting diluted solution was employed in these runs.

To test the sedimentation effect of poly(ethylene oxide) on the silica slurry, 100 milliliters of said slurry was placed in a glass cylindrical container, and the poly(ethylene oxide) solution was added thereto. The resulting mixture was then shaken thoroughly for 30 seconds. The drop in the interface between the slurry and the supernatant liquid was measured with a cathetometer at periodic intervals. This procedure was repeated using different concentrations of poly(ethylene oxide). The results and pertinent data are set forth in Table I below.

Table I

EFFECT OF POLY(ETHYLENE OXIDE) ON COAGULATION OF SLURRY CONTAINING 5.0 WEIGHT PERCENT SILICA

| Time, minutes | Control, no poly-(ethylene oxide) | Drop in slurry—supernatant liquid interface, cm. | | | |
|---|---|---|---|---|---|
| | | 40 p.p.m.[1] | 50 p.p.m.[1] | 60 p.p.m.[1] | 110 p.p.m.[1] |
| 1 | 0 | | | 0.29 | |
| 2 | 0 | | 0.61 | 0.73 | |
| 3 | 0 | | | 1.13 | |
| 4 | 0 | 1.19 | 0.91 | | |
| 5 | 0 | | | 1.70 | |
| 8 | 0 | 1.41 | 1.17 | 1.91 | |
| 15 | 0 | 1.53 | 1.32 | 2.07 | [2] 3.15 |

[1] Parts per million of poly(ethylene oxide), based on total slurry volume. To convert to concentration on weight of slurry solids, multiply by 20.
[2] Sedimentation essentially complete.

EXAMPLE 2

A portion of the silica suspension employed in Example 1 above was diluted with distilled water to give a slurry containing 2.5 weight percent silica, based on total slurry weight. The poly(ethylene oxide) employed in Example 1 was again employed, as was the procedure or technique outlined in said example. The results and pertinent data are set forth in Table II below.

Table II

EFFECT OF POLY(ETHYLENE OXIDE) ON COAGULATION OF SLURRY CONTAINING 2.5 WEIGHT PERCENT SILICA

| Time, minutes | Control, no poly(ethylene oxide) | Drop in slurry—supernatant liquid interface, cm. | | | | |
|---|---|---|---|---|---|---|
| | | 25 p.p.m.[1] | 30 p.p.m.[1] | 40 p.p.m.[1] | 50 p.p.m.[1] | 50 p.p.m., settling and after shaking [1] |
| 1 | 0 | 0.09 | 0.30 | 0.45 | 0.41 | 0.37 |
| 2 | 0 | 0.28 | 0.60 | 0.85 | 0.84 | 0.60 |
| 3 | 0 | 0.37 | 0.85 | 1.11 | 1.04 | 0.86 |
| 4 | 0 | | 1.09 | 1.32 | 1.26 | 1.13 |
| 5 | 0 | 0.68 | 1.33 | 1.47 | 1.61 | 1.38 |
| 6 | 0 | | 1.55 | | 1.89 | 1.63 |
| 7 | 0 | | | 1.71 | 2.13 | 1.91 |
| 8 | 0 | | 1.87 | 1.78 | 2.44 | 2.14 |
| 9 | 0 | | 2.00 | | 2.54 | 2.42 |
| 10 | 0 | 1.38 | 2.10 | 1.88 | 2.67 | 2.66 |
| 11 | 0 | | | | 2.78 | 2.89 |
| 12 | 0 | | | 2.00 | | 3.12 |
| 13 | 0 | | | | | 3.34 |
| 14 | 0 | | | | | 3.48 |
| 15 | 0 | 1.98 | 2.42 | 2.05 | 3.07 | 3.63 |

[1] Parts per million of poly(ethylene oxide), based on total slurry volume. To convert to weight of slurry solids, multiply by 40.

EXAMPLE 3

A dilute silica slurry was prepared by stirring into distilled water a quantity of finely-divided silica.[2] The resulting slurry contained 0.1 weight percent silica, based on the total slurry weight. Poly(ethylene oxide) having a reduced viscosity of 31.3 was added to this slurry in varying quantities as outlined in Example 1 above. The technique or procedure set forth in Example 1 was also followed. The results and pertinent data are set forth in Table III below.

---

[1] Obtained from Linde Air Products Company.

[2] Obtained from Godfrey L. Cabot Company; sold under trademark name of "Carbosil."

Table III
EFFECT OF POLY(ETHYLENE OXIDE) ON COAGULATION OF SLURRY CONTAINING 0.1 WEIGHT PERCENT SILICA

| Time, minutes | Control, no poly(ethylene oxide) | Drop in slurry—supernatant liquid interface, cm. | | | | |
|---|---|---|---|---|---|---|
| | | 6 p.p.m.[1] | 10 p.p.m.[1] | 15 p.p.m.[1] | 20 p.p.m.[1] | 30 p.p.m.[1] |
| 0.5 | 0 | | | 9.38 | 9.52 | 9.61 |
| 1.0 | 0 | | | 9.45 | 9.49 | 9.65 |
| 1.5 | 0 | | | 9.50 | 9.49 | 9.70 |
| 2.0 | 0 | | | 9.56 | 9.56 | |
| 3.0 | 0 | 9.57 | 9.83 | 9.56 | | |
| 5.0 | 0 | 9.65 | 9.88 | 9.58 | 9.61 | |
| 8.0 | 0 | 9.71 | 9.88 | 9.63 | 9.62 | |
| 10.0 | 0 | | 9.95 | 9.65 | | |
| 15.0 | 0 | 9.71 | 10.00 | 9.65 | 9.75 | 9.72 |

[1] Parts per million of poly(ethylene oxide), based on total slurry volume.

EXAMPLE 4

A sample of silica slurry obtained as the by-product of plate glass grinding operations from the Garco Products Company was employed for the following series of tests. The slurry contained 15 weight percent total solids, based on total slurry weight. The technique or procedure set forth in Example 1 above was employed for these runs. Four different reduced viscosity grades of poly(ethylene oxide) was used as will be apparent from Table IV below.

At the termination and recordation of the sedimentation rates (taken at periodic intervals over a 15 minute period), the individual slurry samples were subjected to the full speed agitation of a laboratory Osterizer for one minute. The sedimentation rates were again followed and recorded.

The results and pertinent data are set forth in Table IV below.

Table IV
EFFECT OF POLY(ETHYLENE OXIDE) ON COAGULATION OF SLURRY COMPRISING SILICA; SOLIDS CONTENT 15 WEIGHT PERCENT

| Time, minutes | Control, no poly(ethylene oxide) | Drop in slurry—supernatant liquid interface, cm. | | | | | |
|---|---|---|---|---|---|---|---|
| | | 2 p.p.m.[1] | 20 p.p.m.[1] | 20 p.p.m.[2] | 2 p.p.m.[3] | 20 p.p.m.[3] | 2 p.p.m.[4] |
| 0.5 | 0 | 0.56 | 0.71 | 1.08 | 0.45 | 0.78 | 0.79 |
| 1.0 | 0 | 1.19 | 1.46 | 1.94 | 0.92 | 1.37 | 1.59 |
| 3.0 | 0 | 3.52 | 3.85 | 4.71 | 3.32 | 3.98 | 4.52 |
| 5.0 | 0 | 5.50 | 5.70 | 5.88 | 5.21 | 5.01 | 5.91 |
| 8.0 | 0 | 6.35 | 6.75 | 6.60 | 6.05 | 5.77 | 6.53 |
| 10.0 | 0 | 6.62 | 7.05 | 6.87 | 6.35 | 6.08 | 6.74 |
| 15.0 | 0 | 7.03 | 7.42 | 7.21 | 6.83 | 6.55 | 7.03 |

SEDIMENTATION AFTER OSTERIZING FOR ONE MINUTE

| 0.5 | 0 | 0.71 | | | 0.93 | 1.13 | 1.15 |
| 1.0 | 0 | 1.27 | | | 1.58 | 1.81 | 1.98 |
| 3.0 | 0 | 3.30 | | 3.86 | 3.81 | 4.19 | 4.79 |
| 5.0 | 0 | 5.06 | | 5.67 | 5.78 | 5.87 | 6.18 |
| 8.0 | 0 | 6.59 | 6.54 | 6.85 | 6.57 | 6.39 | 6.68 |
| 10.0 | 0 | 6.83 | 7.14 | 7.06 | 6.80 | 6.59 | 6.86 |
| 15.0 | 0 | 7.19 | 7.48 | 7.37 | 7.15 | 6.86 | 7.22 |

[1] Poly(ethylene oxide) having a reduced viscosity of 5.4.
[2] Poly(ethylene oxide) having a reduced viscosity of 18.7.
[3] Poly(ethylene oxide) having a reduced viscosity of 31.5.
[4] Poly(ethylene oxide) having a reduced viscosity of 72.5.

NOTE.—P.p.m. is parts per million of poly(ethylene oxide), based on total slurry volume.

In Example 5 to follow, the poly(ethylene oxide) employed will be designated as poly(ethylene oxide) No. 12 and poly(ethylene oxide) No. 32 for identification purposes only. The No. 12 polymer was made in a 650-gallon capacity stainless steel autoclave by the heptane suspension process using calcium amide catalyst. The polymer contained 1.2 percent ash by weight as calcium oxide and at the time of the runs had a 1.0 weight percent aqueous bulk viscosity of 1147 centipoises as measured on the Brookfield RVF viscometer at 2 r.p.m. using a No. 1 spindle. The No. 32 polymer was made in a similar autoclave using ethylene oxide modified calcium amide catalyst. To prepare this polymer, 3600 pounds of heptane were charged to the autoclave together with a total feed of ethylene oxide of 910 pounds. The run continued for 20 hours giving a suspension in the autoclave containing 13.3 percent total solids at the end of the run. The temperature during the polymerization was 42 to 48° C., the pressure 15 pounds' gauge. A total of 555 pounds of polymer was produced. The product of this reaction, Polymer No. 32, gave an intrinsic viscosity of 19.3, a reduced viscosity of 39.1, and a 1.0 weight percent aqueous bulk viscosity of 3175 centipoises as measured on the Brookfield RVF viscometer at 2 r.p.m. using a No. 2 spindle. This polymer contained 0.5 percent ash calculated as calcium oxide.

EXAMPLE 5

A slurry of finely-divided silica[3] in distilled water was prepared to give a 1.0 weight percent total solids content, based on the total weight of the slurry. This slurry was agitated and a 100 cc. sample was transferred volumetrically to a graduated cylinder. The sample was again agitated and allowed to stand. The drop in the interface between the slurry and the clear supernatant liquid above the slurry was then followed with a cathetometer and the drop in interface recorded as a function of time. The effect of various concentrations of poly(ethylene oxide) resin (added as a measured amount of 0.1 weight percent solution in water) was determined, together with the combined effect of other materials added to the silica suspension before the poly(ethylene oxide) was added. The results and pertinent data are set forth in Table V below.

Table V
EFFECT OF POLY(ETHYLENE OXIDE) ON COAGULATION OF SLURRY CONTAINING 1.0 WEIGHT PERCENT SILICA

| Slurry additives weight percent based on slurry total solids | pH of slurry | Poly(ethylene oxide) added | | Drop in slurry—supernatant interface in cm. after settling times in minutes | | | |
|---|---|---|---|---|---|---|---|
| | | Weight percent on total slurry volume | Polymer Number | 2 | 4 | 10 | 15 |
| None | 5.72 | None | | 0 | 0 | 0 | 0 |
| Do | | 5 p.p.m. | 32 | 5.67 | 5.86 | 6.56 | 7.04 |
| Do | | 10 p.p.m. | 32 | 4.37 | 5.94 | 6.66 | 7.11 |
| Do | | 50 p.p.m. | 12 | 6.23 | 6.35 | 6.29 | 6.38 |
| Do | | 30 p.p.m. | 12 | 6.32 | 6.87 | 6.98 | 7.11 |
| 5% CaCO₃ | 7.43 | None | | 0 | 0 | 0 | 0 |
| Do | | 15 p.p.m. | 32 | 4.40 | 5.69 | 7.31 | 7.56 |
| Do | | 20 p.p.m. | 32 | 3.81 | 5.25 | 6.87 | 7.12 |
| Do | | 40 p.p.m. | 12 | 6.27 | 7.03 | 7.56 | 7.62 |
| Do | | 60 p.p.m. | 12 | 7.13 | 7.22 | 7.27 | 7.44 |
| 1% Al₂(SO₄)₃ | 3.53 | None | | 0 | 0 | 0 | 0 |
| Do | | 30 p.p.m. | 32 | 5.40 | 6.00 | 6.15 | 6.21 |
| Do | | 50 p.p.m. | 32 | 6.53 | 6.73 | 6.74 | 6.77 |
| Do | | 15 p.p.m. | 12 | 2.95 | 3.59 | 6.02 | 6.42 |
| Do | | 25 p.p.m. | 12 | 6.53 | 6.52 | 6.64 | 6.64 |
| 2% Mg(CO₃) | 6.72 | None | | 0 | 0 | 0 | 0 |
| Do | | 40 p.p.m. | 32 | 6.62 | 7.03 | 7.08 | 7.18 |
| Do | | 60 p.p.m. | 32 | 6.89 | 7.05 | 7.14 | 7.23 |
| Do | | 5 p.p.m. | 12 | 0 | 4.56 | 6.78 | 7.59 |
| Do | | 8 p.p.m. | 12 | 0 | 4.51 | 6.65 | 7.43 |

It is obvious that various ramifications and modifications of the instant invention can be made in the light of the instant disclosure.

What is claimed is:

1. A method of coagulating a liquid suspension comprising silica which comprises adding to said liquid suspension a coagulating amount of poly(ethylene oxide) which has a reduced viscosity of at least 1.0 as determined at a concentration of 0.2 gram of said poly(ethylene oxide) per 100 milliliters of acetonitrile at 30° C.

2. The method of claim 1 wherein said poly(ethylene oxide) concentration is in the range of from about 0.0001 to about 0.05 weight percent, based on the total slurry weight.

[3] Obtained from Linde Air Products Company.

3. The method of claim 1 wherein said poly(ethylene oxide) concentration is in the range of from about 0.002 to about 5.0 weight percent, based on the weight of suspended solids in said slurry.

4. The method of claim 3 wherein said poly(ethylene oxide) concentration is in the range of from about 0.002 to about 2.0 weight percent, based on the weight of suspended solids in said slurry.

5. The method of improving the clarity of water-containing silica particles suspended therein which comprises adding to said water poly(ethylene oxide) having a reduced viscosity of at least 1.0 as determined at a concentration of 0.2 gram of said poly(ethylene oxide) per 100 milliliters of acetonitrile at 30° C., in an amount sucient to improve the clarity of said water.

6. The method of claim 5 wherein the poly(ethylene oxide) concentration is in the range of from about 0.002 to about 2.0 weight percent, based on the weight of suspended solids in said water.

References Cited in the file of this patent

UNITED STATES PATENTS

| | | |
|---|---|---|
| 1,994,328 | Tefft | Mar. 12, 1935 |
| 2,326,395 | Samuel | Aug. 10, 1943 |
| 2,394,083 | Lintz | Feb. 5, 1946 |
| 2,601,597 | Daniel et al. | June 24, 1952 |
| 2,607,750 | Wilson et al. | Aug. 19, 1952 |
| 2,688,550 | McFarlane | Sept. 7, 1954 |
| 2,728,725 | Gloor | Dec. 27, 1955 |

FOREIGN PATENTS

| | | |
|---|---|---|
| 725,460 | Great Britain | Mar. 2, 1955 |
| 1,083,610 | France | Jan. 11, 1955 |
| 154,799 | Australia | Jan. 19, 1954 |
| 202,957 | Austria | Oct. 15, 1958 |

OTHER REFERENCES

Schweitzer: "Rubber Chemistry and Technology," vol. 13 (1940), pages 408–414 relied upon.

Kemmer: Chem. Abstracts, vol. 46 (1952), column 3686.

Dow Diamond, vol. 18, No. 1, March 1954, pages 1–3.

Guillot et al.: "Le Sang," vol. 19, pages 59–61 (1948).